Figure 1:
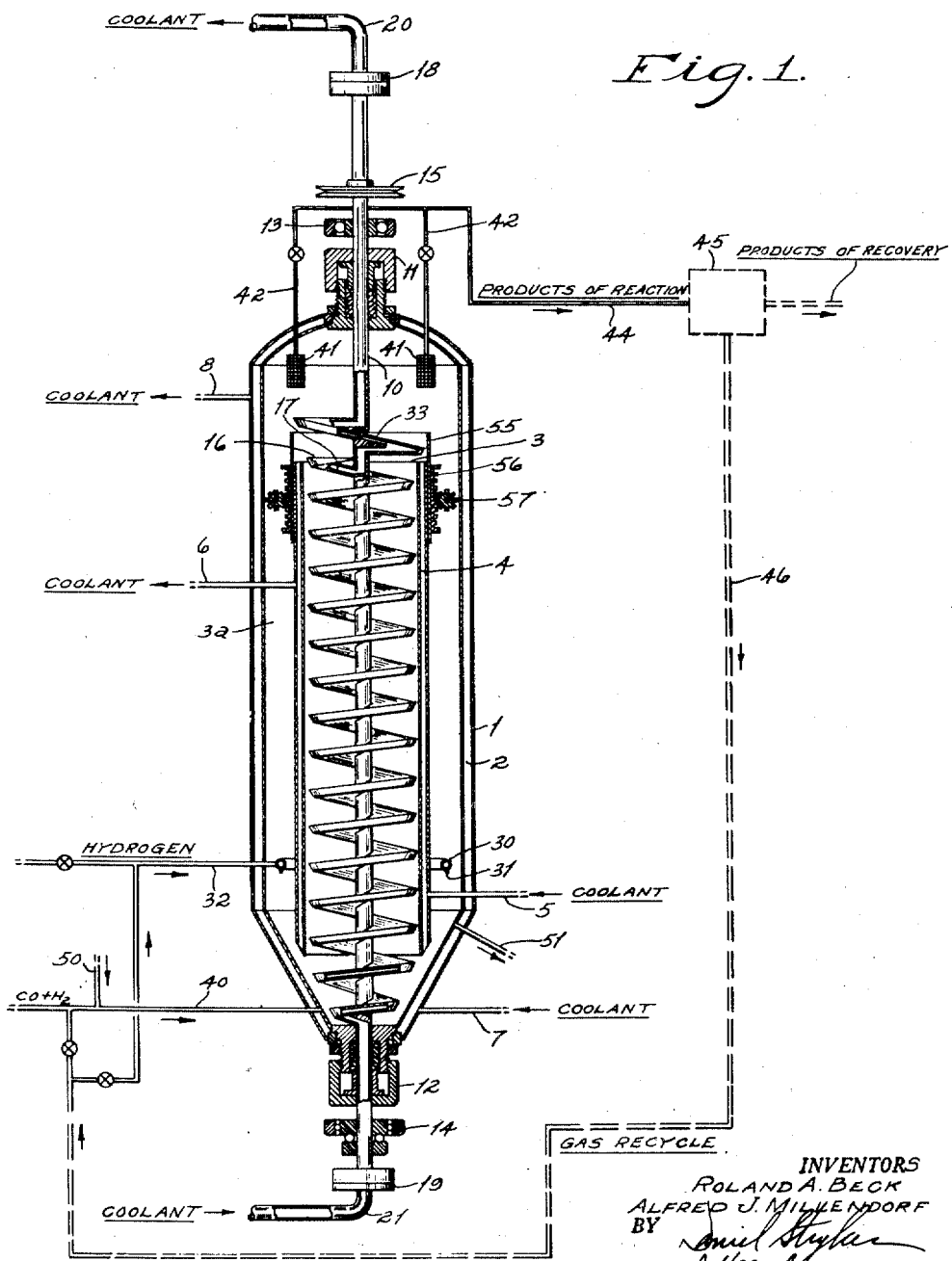

UNITED STATES PATENT OFFICE 2,540,706

PROCESS AND APPARATUS FOR EFFECTING CATALYTIC REACTIONS

Roland A. Beck, Fishkill, and Alfred J. Millendorf, Beacon, N. Y., assignors to The Texas Company, New York, N. Y., a corporation of Delaware Application May 22, 1947, Serial No. 749,848

9 Claims. (Cl. 260—449.6)

The present invention relates to the catalytic conversion of a fluid reactant stream, by contact with a solid catalyst in particle form and more specifically is concerned with catalytic synthesis operations wherein the catalyst is held in a state of more or less uniform aeration and agitation by controlled mechanical agitation while the reactants flow past the particles in intimate contact with surfaces thereof.

The present invention concerns an improvement in the apparatus and the method previously disclosed in copending applications, Serial Nos. 700,507 and 700,508, filed October 1, 1946, the latter having become Patent No. 2,501,695, issued March 28, 1950, to which reference is made for details of subject matter disclosed therein.

More particularly, the invention contemplates a more or less violent stirring and agitation of the synthesis catalyst particles which are thereby continuously subjected to random upward impelling forces and the downward effect of gravity so as to occupy the reaction zone in an inflated condition of random agitation with all active surfaces presented to contact with the upflowing reactant gas. At the upper extremity of the reaction zone the catalyst is positively subjected to a downwardly acting propelling force which tends to prevent catalyst particles from arising out of the reaction zone, and controls their ultimate return to the reaction zone or to an associated stripping zone as may be desired.

The preferred apparatus of this invention comprises an upstanding, preferably cylindrical reaction zone having a helical screw-like impeller rotatably supported therein and effective, upon rotation to stir and agitate a mass of particulate catalyst furnished to its lower extremity, and to scoop, impel or elevate the catalyst upwardly in the reaction zone. A second short, reversely directed helical screw-like impeller, progressing in an opposite rotational direction to the first helical screw and preferably rotated therewith, impinges catalyst particles lifted or impelled upwardly above the first helical screw and directs them downwardly or laterally.

The surfaces of the first named helical screw may occupy only a portion of the cross-sectional area of the cylindrical reaction zone permitting elevated catalyst to respond to the force of gravity and cascade downwardly, if desired. Moreover, means may be provided for directing all, or any desired portion, of the catalyst particles projected above the top of the reaction zone to a stripping zone.

The present invention has particular application to the synthesis of hydrocarbons, oxygenated hydrocarbons and the like by the reduction of carbon monoxide with hydrogen in the presence of a typical solid catalyst in particle form. The inflated mass of agitated and aerated catalyst particles in the reaction zone is accordingly available for contact with the reactant gases, and the usual tendency or propensity for the catalyst to conglomerate, coalesce, or ball up, with resulting impairment of surface contact is mechanically overcome. In particular, the present invention enables the entire reaction zone to be held, within wide limits, at any desired and predetermined degree of relative agitation irrespective of the velocity of reactant flow. On the other hand, in the absence of such means as the reversely acting impeller at the upper extremity of the reaction zone, this desired effect may be prevented by the tendency of catalyst to be projected out of the reaction zone. In short, unless agitation is restricted accordingly, an excessive proportion of the catalyst leaves the reaction zone, clogging the filters, reacting under uncontrolled temperature conditions, and demanding an uncontrolled rate of catalyst recirculation. With the present invention, however, controlled catalyst fluidization is available irrespective of the rate of gas flow, without these disadvantages.

In particular, fluidization may be maintained at any predetermined level throughout the reaction zone with a reactant gas velocity otherwise insufficient to permit such fluidization.

Moreover, even in the case of readily fluidizable catalyst, operation is regularized by the elimination of catalyst slugging or passage of the reactants in the form of bubbles which impair desired uniformity of contact in the reaction zone and by preventing the aforementioned concretion of particles responsible for an apparent change in catalyst density.

So also controlled uniformity of catalyst fluidization is of particular advantage in the synthesis of hydrocarbons where the shrinkage in volume accompanying the interaction of the reactants results in progressively lower gas velocities toward the outlet. In accordance with the present invention, the upper portion of the contact mass may be set into any desired condition of expanded agitation.

Figure 2:
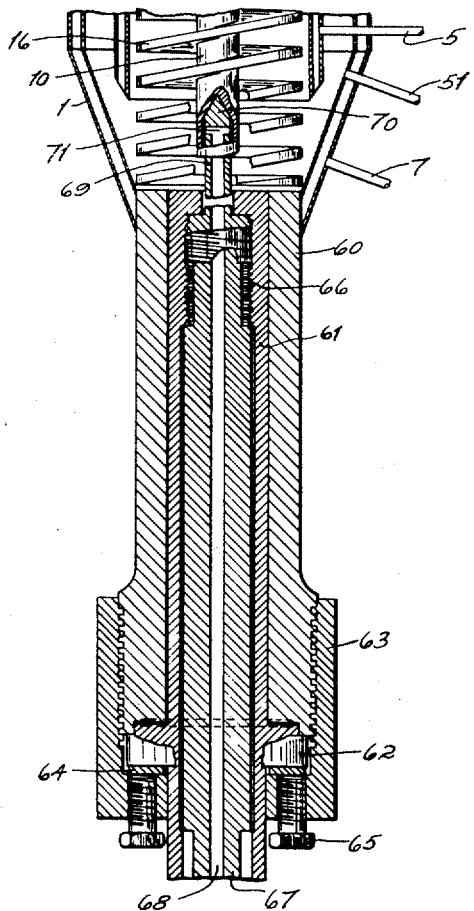

Reference will now be made to the accompanying drawing wherein Figure 1 discloses more or less diagrammatically a vertical section through a reactor embodying the features of the present invention; and Figure 2 is a fragmentary sectional view showing a pertinent modification thereof.

In Figure 1, numeral 1 designates a vessel having a hollow wall providing a space 2 through which a cooling fluid may circulate.

The numeral 3 designates a cylindrical vessel, supported within the vesesl 1. The vessel 3 is also constructed with a hollow wall to provide a space 4 through which cooling fluid may circulate. As indicated the vessel 3 is of smaller diameter than the vessel 1 so that an annular space 3a is provided between the exterior wall surface of the inner vessel 3 and the inner wall surface of the outer vessel 1. Pipe connections 5 and 6 provide means for introducing cooling fluid to and removing such fluid from the jacket space 4. Similar pipe connections 7 and 8 provide means for introducing cooling fluid to and removing it from the jacket space 2 of the outer vessel 1.

The numeral 10 designates a shaft axially supported within the concentric vessels. The upper and lower extremities of the shaft 10 extend through stuffing boxes 11 and 12 respectively, which boxes are provided in the upper and lower extremities respectively of the vessel 1. The shaft 10 is capable of rotation within the stuffing boxes which latter provide against leakage of fluids and also catalyst from the interior of the vessel.

Bearings 13 and 14 provide stationary bearing surfaces for the shaft 10 and in which it rotates, rotation being effected by rotation of a pulley or gear 15 integrally attached to a portion of the shaft extending outside the vessel 1. The bearing surfaces are adapted to oppose lateral and vertical thrust.

The portion of the shaft 10 extending through the inner vessel 3 is provided with a hollow helix 16 which is also made integral with the shaft. The hollow space of the helix 16 is indicated by the numeral 17. The interior of the hollow helix at its lower end is in fluid communication with the hollow interior of the lower extremity of the shaft 10.

The upper and lower ends of the shaft 10 terminate in couplings 18 and 19 respectively. These couplings are each formed of two sections, namely, a rotating section and a fixed section. The rotating sections are rigidly attached to the upper and lower ends of the shaft 10. During rotation of the shaft 10, these rotating sections form a sliding and leak-proof joint with their companion fixed sections of the couplings 18 and 19 which are of the stuffing box variety. The fixed sections are rigidly attached to pipes 20 and 21 respectively.

The lower portion of the vessel 1 is of conical construction, and the bottom rim of the inner vessel 3 approaches the inner conical wall of vessel 1 sufficiently to provide a restricted circular space through which the solid catalyst in particle form may descend as will be mentioned later.

The lower end of the helix 16 is also tapered so as to conform to the interior of the conical bottom of the vessel 1.

The peripheral and under edge of the helix is beveled at an angle of about 30° from the adjacent inner wall of the vessel 3 thereby forming a knife-like edge adjacent the inner wall of the reaction zone. The clearance between the knife-like edge and the vessel varies with the size of the reactor and the rate at which it is desired to have powdered catalyst gravitate towards the lower portion of the reaction zone. Although this may be varied depending upon such factors as the diameter of the helix, it has been found that this tapered edge of the helix is advantageous from the standpoint of preventing catalyst particles from jamming or lodging between the peripheral edge of the helix and the adjacent wall surface of the reactor.

While not indicated in the drawing, the flights of the helix may have small tubular ports extending therethrough to provide perforations through which gaseous reactants may rise.

The numeral 30 designates a ring distributor positioned within the annular space between the inner and outer vessels, the ring being provided with a plurality of ports or nozzles 31 projecting from the ring. A pipe 32 communicates with the ring 30 through which gaseous fluid may be introduced as will be described.

A second hollow helix 33, preferably of greater diameter than helix 16, as shown, is integrally disposed on the shaft 10 just above the helix 16, extending upwardly in the reverse rotational direction. Helix 33 may be relatively short in a vertical direction. Its interior is in communication, at its lower end, with the interior of the helix 16, and is also in fluid communication with the hollow interior of shaft 10.

In the embodiment shown, the reversely extending helix is disposed just above the upper margin of the tubular vessel 3 and since it rotates in the same direction as the lower helix, it operates to impinge particles ejected from the upper extremity of the vessel 3 and check their upward velocity. Accordingly, ejection of particles is effectively checked and particles given a lateral component of motion whereby they may move outwardly and downwardly into the annular space between the inner and outer vessels.

A sleeve or cylinder 55 embraces the upper extremity of the cylindrical vessel 3 and is axially adjustable thereon through the agency of a rack and gear apparatus controllable externally through shaft 57 by means, not shown.

By vertical adjustment of this sleeve 55, any predetermined portion of the catalyst projected upon the top of the helix 16 may be positively returned to the reaction zone. Accordingly the adjustable sleeve functions as a proportioning mechanism permitting controlled distribution of the catalyst reaching helix 33, between the stripping and reaction zone. Moreover, at times when stripping is not requisite, all of the catalyst impinging the helix 33 may thus be redirected to the reaction zone.

Similarly if sleeve 55 is adjusted to its lowermost position, and the lower face of helix 33 is configurated to direct all impinging particles radially, then substantially all of the catalyst reaching helix 33 can be directed into the stripping zone.

In operation of the foregoing embodiment, synthesis gas comprising hydrogen and carbon monoxide usually in the molar ratio of about 2:1 is conducted into the bottom of the vessel 1 through pipe 40. The vessel contains catalyst powder which includes particles of a size and settling rate which would not fluidize at the upward linear velocity of the introduced gas. The powder is, however, placed in a condition of fluidization by rotating the helix so as to scoop and project catalyst upwardly until the reaction zone is substantially uniformly occupied by fluid phase catalyst. The gaseous reactants rise along and about the flights of the rotating helix in contact with the thus agitated and aerated particles.

The unreacted gas and products of reaction containing only a small amount of entrained catalyst powder, rise into the top of the vessel I above the vessel 3. The gases and vapors are caused to flow through filters 41 which may be constructed of porous alundum or other porous material adapted to permit passage of gases and effect removal of suspended solids, the removed solids thus remaining within the reaction vessel. The gases and vapors flow from the filters 41 through pipes 42 to a common discharge pipe 44 which may lead to suitable product recovery means indicated at 45.

Provision may be made for separating unreacted gases or constituents thereof from the products of reaction and recycling them through a conduit 46 to the previously mentioned pipe 40.

Since the synthesis reaction is highly exothermic, it is necessary to dissipate the heat of reaction and this is accomplished by circulating a cooling liquid such as water or an organic compound such as diphenyl through the cooling jackets surrounding the inner and outer vessels and through the hollow helix. The cooling liquid for each helix may be introduced through the pipe 21 which communicates through the coupling 19 with the lower end of the helix 16. This liquid then flows through the interior of each helix and is discharged therefrom into the upper end of the hollow shaft 10 from which it flows through the coupling 18 and the pipe 20.

The catalyst powder rising to the top of the inner vessel 3 spills over into the annular space 3a and moves downwardly therethrough countercurrently to a rising stream of stripping gas. This stripping gas, for example hydrogen, is introduced through the pipe 32 into the distributing ring 30 from which it is discharged into the annular space. The stripping gas thus effects desorption of hydrocarbons and other products of reaction which are adsorbed by the catalyst during its passage upwardly through the vessel 3.

Catalyst powder may be added to the reactor through pipe 50 and pipe 40, through which it is forced by the feed gas. Used catalyst may be drawn off through a pipe 51. Provision, not shown, may be made for continuously drawing off a small amount of used catalyst through pipe 51, reactivating it, and recycling it to the reactor through pipe 50.

The alternative embodiment of the invention shown in Figure 2 employs a shaft 10 and helix 16 which are solid, and which accordingly make no provision for passing cooling liquid therethrough. Therefore, necessary cooling is accomplished through the agency of the cooling jackets 2 and 4, shown above.

The upper portion of the reactor of Figure 2 has been omitted since it is substantially identical with that of Figure 1 except for omission of the coupling 18 and coolant conduit 20.

In Figure 2 the lower conical portion of the vessel I is joined to bottom construction including an outer sleeve 60 which receives an inner sleeve 61. Inner sleeve 61 is located, as shown, by means of integral, peripheral flange 62, clamped against the lower end of sleeve 60 by means of threaded cap 63, compression washer 64, and compression screws 65.

The inner sleeve 61 threadedly receives, as at 66, a combination centering pin and inlet feed conduit 67. This latter element is accordingly bored centrally as at 68 to conduct reactant gases upwardly from any source not shown, and at its upper portion comprises an extension or pin 69 of relatively small diameter received in a corresponding central recess in the lower extremity of shaft 10 as shown, to center and support that member. This function is enhanced by providing a conical or tapered extremity 70 for the extension or pin 69 mating with a like conformation of the shaft.

The feed gas passing upwardly through conduit 68 passes outwardly through diametrally disposed branch conduit 71 into the space between the pin 69 and the encompassing recess, sufficient clearance being provided for this purpose. Thence the gas passes downwardly to the lower end of shaft 10 and from there is distributed uniformly to the lower portion of the reaction zone.

It is important to note that the helix 16 of this embodiment is not tapered as in Figure 1, but has its peripheral edge cylindrically disposed so that returned catalyst gravitates directly into its lower margins and is agitated upwardly as described above.

Advantageously the lower extremity of helix 16 is spaced only a short distance from the upper surfaces of the sleeves 60 and 61, such that no material deposit of unagitated catalyst is permitted to accumulate thereon.

With this arrangement access is had to the lower portion of the reaction zone by removal of the sleeve 61.

With more particular reference to the details of the reaction carried out in the reactor, the reactant mixture of hydrogen and carbon monoxide may be converted by any familiar catalyst and under any familiar temperature or pressure. The usual catalyst for this reaction, as is known, is a metal of the iron group or ruthenium, each operative at its own characteristic temperature and pressure. Iron catalysts are particularly advantageous under the conditions of the present invention and usually operate at temperatures of 500–700° F. and elevated pressures. The catalyst may include the usual activators and promoters and the particle size may vary widely as for example from 60 to 325 mesh or finer.

In accordance with one specific example, a tubular reaction zone is provided with a mass of iron catalyst having a particle size of about 100 mesh and comprising metallic iron containing about 4% alumina and about 1% potassium oxide. A helix as disclosed is disposed within the reaction zone with its lower portion immersed in a supply of catalyst. With the helix at rest, the powder in settled condition forms a bed of about 6 inches deep. The helix is set into rotation at the rate of about 600 R. P. M. and the catalyst immediately rises to the top of the tube at which a reversely extending helix rotated in the same direction impinges the substantial stream of catalyst particles ejected out of the tube, and directs them laterally and downwardly.

A mixture of hydrogen and carbon monoxide in the molar ratio of substantially 2:1 is introduced at the bottom of the helix and at a linear velocity of about 0.04 feet per second in the reaction zone. Temperature is maintained by adequate cooling surfaces at 600° F. at a pressure of 200 pounds per square inch gauge.

The effluent gases removed from the top of the vessel yield hydrocarbon reaction products equal to about 170 grams of hydrocarbon per cubic meter of synthesis gas. It is to be noted that the rate of gas flow mentioned in the foregoing example is insufficient to cause fluidization of the catalyst particles referred to in the absence of the rotation of the helix. A substantially identical improvement, however, occurs where initially finer catalyst powder, during use, becomes coated with waxy adherent deposits which otherwise tend to agglomerate the powder into larger or adherent particles. In the foregoing examples, measurable increase in yield of liquid products results from elimination of accumulations of catalyst above the reaction zone, and particularly about the filter where uncontrolled rise of temperature causes the formation of excess undesired gaseous hydrocarbons.

Reference herein to a helical screw contemplates broadly flanges or surfaces which project laterally on their axis of rotation and progress axially in convolutions angularly disposed to a plane transversely intercepting the axis. The angle may vary insofar as it does not reverse its direction. Obviously the agitating helix is rotated so as to scoop up, lift or inflate the catalyst while the upper helix acts oppositely. The same effect may be achieved, of course, by oppositely rotating the upper helix if its convolutions progress in the same rotational direction.

While hydrogen has been referred to above as a stripping medium, other gases may be used including a recycled gas derived from the end products of the reaction. Such recycle gas may be enriched with hydrogen. Preferably the velocity at which the stripping gas rises through the annular space 3a is such as not to entrain descending catalyst to any substantial extent. Stripping gas rising above the annular space 3a mingles with the products of reaction and is removed therewith.

Broadly the term "hydrocarbon" is used herein to include those oxygenated compounds which result from the catalytic reduction of carbon monoxide and hydrogen.

While it has been clearly shown above that the invention finds idealized application in the synthesis of hydrocarbons, nevertheless, it has many benefits, obvious from the foregoing, in connection with other conversion reactions such as polymerization and dehydrogenation and may be used in connection with either endothermic or exothermic processes.

Obviously many modifications and variations of the invention as hereinbefore set forth, may be made without departing from the spirit and scope thereof, and therefore only such limitations should be imposed as are indicated in the appended claims.

We claim:

1. In the catalytic conversion of fluid reactants into different chemical compounds wherein a stream of reactant fluids is passed upwardly through a mass of catalyst in solid particle form disposed within a reaction zone and wherein the catalyst mass is subjected to mechanical agitation in the reaction zone, including repeated projection of particles in an upward direction at a sufficient rate to maintain said catalyst particles in the form of a fluid phase within the reaction zone whereby a portion of the catalyst particles tend to be projected continuously upwardly beyond the upward extremity of the reaction zone with the effluent products of reaction, the improvement which comprises withdrawing the effluent products of reaction from the upper extremity of said reaction zone containing said upwardly projected, solid particles, separating the upwardly projected particles from the effluent stream by continuously subjecting said particles at a point immediately above the upper extremity of said reaction zone to mechanical impact by an inclined surface moving transversely to the path of said upwardly projected particles and being inclined upwardly and forwardly in its direction of movement such that the impinged particles are caused to rebound downwardly and outwardly, and continuously directing a predetermined portion of said downwardly rebounding particles into the top of said reaction zone.

2. In the catalytic conversion of fluid reactants into different chemical compounds wherein a stream of reactant fluids is passed upwardly through a mass of catalyst in solid particle form disposed within a reaction zone and wherein the catalyst mass is subjected to mechanical agitation in the reaction zone, including repeated projection of the particles in an upward direction at a sufficient rate to maintain a fluid phase of catalyst within the reaction zone such that a substantial portion of the catalyst tends to be projected upwardly beyond the upper extremity of the reaction zone with the effluent products of reaction, the improvement which comprises withdrawing the effluent products of reaction upwardly from the said upper extremity of the reaction zone containing said upwardly projected, solid particles, positively separating the upwardly projected, solid particles from the effluent stream by continuously subjecting said upwardly moving particles at a point directly over said reaction zone, to mechanical impingement by a laterally moving surface having an angle of inclination with respect to the vertical such that the impinged particles are caused to rebound downwardly, intercepting a predetermined portion of the downwardly rebounding particles, and continuously redirecting said intercepted particles of the catalyst into the top portion of said reaction zone.

3. The method according to claim 2 wherein the fluid reactants comprise essentially hydrogen and carbon monoxide and the catalyst is a hydrocarbon synthesis catalyst effective to convert the reactants in the reaction zone into hydrocarbons and the like.

4. In the catalytic conversion of fluid reactants into different chemical compounds wherein a stream of reactant fluids is passed upwardly through a mass of catalyst in solid particle form disposed within a reaction zone and wherein the catalyst mass is subjected to mechanical agitation in the reaction zone, including repeated projection of the particles in an upward direction at a sufficient rate to maintain a fluid phase of catalyst within the reaction zone such that a substantial portion of the catalyst tends to be projected upwardly beyond the upper extremity of the reaction zone with the effluent products of reaction, the improvement which comprises withdrawing the effluent products of reaction from the said upper extremity of the reaction zone containing upwardly projected solid particles, separating the upwardly projected, solid particles from the effluent stream by continuously passing the stream of effluent reaction products through an impeller having helical surfaces developed in one direction of rotation about a vertically extending axis and continuously rotated about its axis in that rotational direction at which the leading edge of the helical surfaces in that edge most remote from the reaction zone such that the upwardly moving particles are impinged by the moving helical surfaces and caused to rebound in a downward direction, intercepting a predetermined portion of the downwardly directed catalyst particles and continuously directing said intercepted portion of the stream of catalyst into the top of the reaction zone.

5. The method according to claim 4 wherein the remaining portion of the downwardly impelled catalyst is directed to a stripping zone, therein subjected to the passage of a stripping gas and thereafter returned to the reaction zone.

6. In a catalytic reactor for contacting a fluid reactant stream with a catalyst in solid particle form, an upstanding reaction vessel having a substantially open upper extremity and provided with means for introducing fluid reactant into the lower portion thereof and means for withdrawing reaction products from the upper extremity thereof, mechanical agitating means within said vessel effective to continuously disperse the catalyst particles as a fluid phase throughout the upflowing reactant stream and knockback means disposed thereabove, at the upper extremity of said vessel, for continuously redirecting thereinto catalyst particles which tend to be projected upwardly therebeyond, said agitating means and said knockback means each comprising a rotatable impeller having helically arranged surfaces disposed about a substantially vertical axis, the helical surface of said agitating impeller being developed in one direction of rotatation along the axis of the helix and the helical surface of the knockback impeller being developed along the opposite direction of rotation along the same axial direction, and means for rotating said impellers in the same rotational direction to effect upward agitation of the catalyst particles by the mechanical agitating means and continuous impingement of catalyst particles projected upwardly from the reaction zone by the helical surfaces of said knockback means such that the particles are caused to rebound downwardly.

7. A reactor according to claim 6, wherein means is provided for relative adjustable displacement of the upper extremity of said vessel and said knockback impeller in said axial direction such that predetermined portions of the particles rebounding from the knockback impeller may be redirected into the upper extremity of the reaction vessel.

8. In a catalytic reactor for contacting a fluid stream of reactants with a catalyst in solid particle form, an upstanding reaction vessel having a substantially open upper extremity and provided with means for introducing a fluid reactant into the lower portion thereof, and means for withdrawing reaction products from the upper extremity thereof, mechanical agitating means within said vessel effective to continuously disperse the catalyst particles as a fluid phase throughout the upflowing reactant stream, and knockback means disposed above said agitating means, at the upper extremity of said vessel constructed and arranged to continuously redirect thereinto catalyst particles which tend to be projected upwardly therebeyond, said agitating means and said knockback means each comprising an impeller rotatable about a vertical axis and each having a helically arranged surface.

9. A catalytic reactor according to claim 8, wherein the upper extremity of said reaction vessel comprises an adjustable baffle moveable axially toward and away from said knockback impeller, and means for adjusting said baffle in said vertical path of movement to intercept predetermined portions of said downwardly rebounding catalyst particles for redirection into the upper extremity of said reaction vessel.

ROLAND A. BECK.
ALFRED J. MILLENDORF.

REFERENCES CITED

The following references are of record in the file of this patent:

UNITED STATES PATENTS

| Number | Name | Date |
|---|---|---|
| 158,904 | Carr | Jan. 18, 1875 |
| 1,984,380 | Odell | Dec. 18, 1934 |
| 2,419,088 | Putney | Apr. 15, 1947 |